US006185003B1

(12) United States Patent
Oyen

(10) Patent No.: US 6,185,003 B1
(45) Date of Patent: Feb. 6, 2001

(54) METHOD AND APPARATUS FOR PRINTING DIGITAL HALF-TONE IMAGES

(75) Inventor: Johannes Paulus Hubertus Oyen, Roermond (NL)

(73) Assignee: Oce-Nederland B.V. (NL)

(*) Notice: Under 35 U.S.C. 154(b), the term of this patent shall be extended for 0 days.

(21) Appl. No.: 08/850,222

(22) Filed: May 1, 1997

(30) Foreign Application Priority Data

May 1, 1996 (NL) .................................................... 1002975

(51) Int. Cl.$^7$ ...................................................... H04N 1/23
(52) U.S. Cl. ........................ 358/1.9; 358/456; 358/298; 382/254; 382/266
(58) Field of Search .................................. 395/109, 101; 358/455, 456, 458, 534, 1.1, 1.2, 1.9; 382/254, 266, 269, 299

(56) References Cited

U.S. PATENT DOCUMENTS

| 4,387,983 | 6/1983 | Masegi . |
| 4,847,641 | 7/1989 | Tung . |
| 5,231,519 | * 7/1993 | Koike .................................. 358/456 |
| 5,486,927 | * 1/1996 | Koizumi et al. ...................... 358/298 |
| 5,815,605 | * 9/1998 | Koike .................................. 382/269 |
| 6,061,151 | * 1/1996 | Ono ..................................... 382/254 |

FOREIGN PATENT DOCUMENTS

| 3729936A1 | 3/1988 | (DE) . |
| 4106458A1 | 8/1991 | (DE) . |
| 0523974A2 | 1/1993 | (EP) . |
| 0526738A2 | 2/1993 | (EP) . |
| 0606139A2 | 7/1994 | (EP) . |

* cited by examiner

Primary Examiner—Thomas D. Lee

(57) ABSTRACT

A method of reproducing images formed from binary values of basic pixels arranged in a raster, with an electrophotographic printing unit having an electrically chargeable photo-conductive medium, a selectively activatable light source to discharge of the medium and a developing unit for developing the said medium with toner powder. The method processes the digital image data to compensate for properties of the printing unit by: generating two sub-pixels for each basic pixel, where a first sub-pixel always corresponds in value to the value of the associated basic pixel and a second sub-pixel has a value that depends upon the value of the associated basic pixel and upon the values of basic pixels in a predetermined area around the associated basic pixel; and generating control signals to activate the light source in accordance with each of the generated sub-pixels. Initially, the second pixel is given the same value as that of the associated basic pixel. If, however, this value specifies the activation of the light source and the values of basic pixels in the area around the associated basic pixel indicate that there is a transition in that area between an image portion for exposure and one which is not to be exposed, then the value of the second sub-pixel is converted to the value which does not activate the light source.

30 Claims, 4 Drawing Sheets

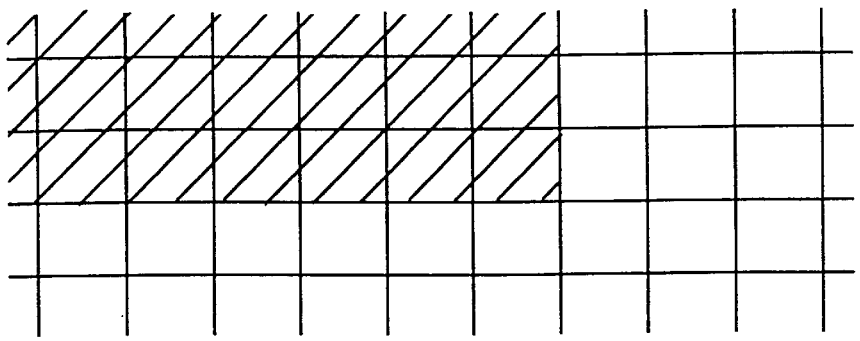
FIG. 3A
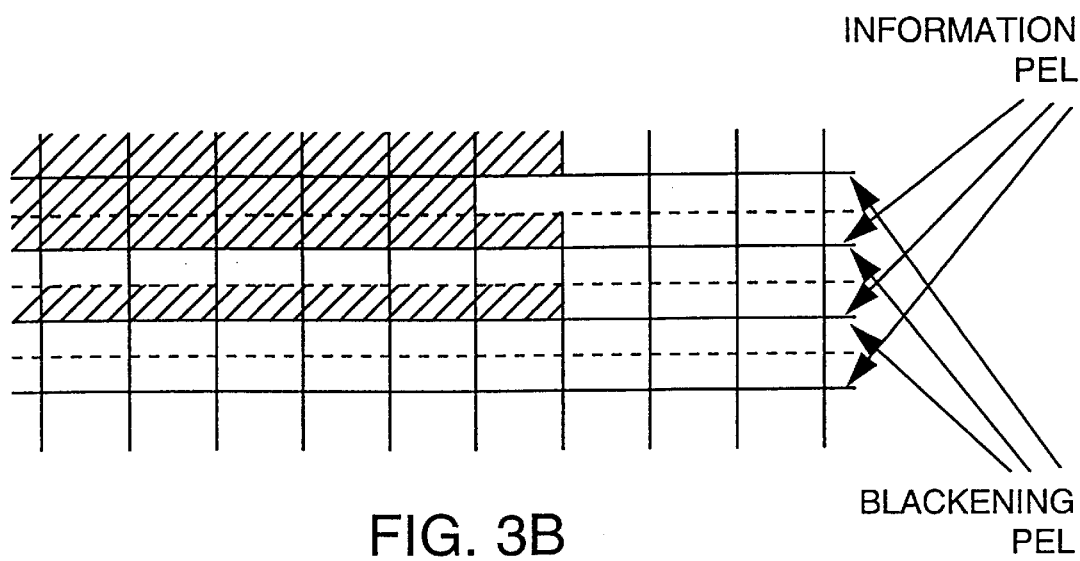
FIG. 3B
FIG. 4

METHOD AND APPARATUS FOR PRINTING DIGITAL HALF-TONE IMAGES

FIELD OF THE INVENTION

The invention relates to a method of reproducing images on the basis of digital image data containing binary values of basic pixels (as defined infra) arranged in a raster, with an electrophotographic printing unit comprising at least one electrically chargeable photo-conductive medium, a selectively activatable light source for image-wise discharge of the said medium and a developing unit for developing the said medium with toner powder, wherein control signals for activating the said light source are generated on the basis of the digital image data, which control signals are adapted to compensate for properties of the printing unit.

The invention also relates to apparatus for application of the said method.

BACKGROUND OF THE INVENTION

Methods of reproducing digital binary images (also termed "half-tone images") are generally known. A charged photo-conductive medium is exposed pixel-wise and thus discharged by way of a light source, e.g., an array of LEDs which is disposed transversely to the direction of transport of the photo-conductive medium. The result is a charge image formed of charged and discharged areas. The photo-conductive medium is then passed along a developing unit, usually a rotating magnetic roller with a developing powder. In these conditions the charge image is developed with toner.

There are two alternative systems with regard to exposure. In a first system, charged areas on the photo-conductive medium are developed while the discharged areas remain free. A system of this kind is termed a "white-writer". In the other system the converse is the case. This is achieved by applying, between the developing unit and the photo-conductive medium, an electrical voltage difference equal to the surface potential of charged areas of the photo- conductive medium. A system of this kind is termed a "black-writer".

In electrophotographic printers, the light source is usually such that it exposes a somewhat larger area than corresponds to the dimensions of a pixel. The reason for this is to prevent unexposed areas from remaining between the pixels. In the case of white- writers the result of this is that the areas developed with toner powder become smaller than intended, and this becomes particularly visible as a narrowing of lines and partial or complete disappearance of fine details. In black-writers, on the other hand, the areas developed with toner powder become somewhat larger, so that narrow lines are conspicuously widened and, for example, small letter characters merge.

Another effect that influences the edges of developed image portions is that in many developing systems, particularly those using developing powders of relatively high resistivity, electrical edge fields occur which cause enhanced development of toner at and just outside the edge of areas for development. In the case of white-writers, this electrical edge effect counteracts the said exposure effect and partly cancels it out, but in black-writing systems the two effects work in the same direction, so that action is required particularly in the case of the latter systems.

An obvious remedy to counteract extension of the exposed area would be to make the area exposed per pixel smaller. This can be done, for example, by reducing the intensity of the light source. The intensity of the light spot projected on to the photo- conductive medium for a pixel decreases from the center, frequently approximately like a Gaussian curve. A reduction of the intensity is therefore first perceptible at the edges of the light spot because a larger proportion of the descending flanks falls below the sensitivity threshold of the photo-conductive medium.

A disadvantage of this remedy, however, is that the discharge is locally no longer complete in larger exposed areas. In black-writers, the remaining residues of the charge obstruct the development so that the optical density of a print becomes unacceptably low in larger image areas. In white-writers, the remaining charge residues cause a (slight) development of toner powder in areas which should have remained white.

A second remedy to counteract the described undesired extension of the exposed area comprises shifting the time when the light source is switched on when the latter enters and leaves respectively an area for exposure during its relative movement with respect to the photo-conductive medium, i.e., variable timing for the light source. In the case of a white-writer, a method of this kind is described in U.S. Pat. No. 4,387,983. In this way the edge of an exposed and hence discharged area can be so shifted on the photo-conductive medium that the boundary of the developed area is situated exactly at the required location. A disadvantage of this solution is that it requires intervention in the timing of the light source control. Since high-frequency signals are involved here, specialized expensive components must be used for implementation. Moreover, in the case of LED arrays particularly, the control circuits associated with the commercially available products are often not suitable for carrying out small timing changes applicable solely to portions of the array. LED arrays in which this is possible are very expensive.

SUMMARY OF THE INVENTION

The object of the invention is to provide a solution to the above problems while retaining fixed timing for the light source.

To this end, according to the invention, two sub-pixels are generated for each basic pixel of the digital image data, namely a first sub-pixel always corresponding in value to the value of the associated basic pixel and a second sub-pixel for which the value is determined in dependence on the value of the associated basic pixel and on the values of basic pixels in a predetermined area around the associated basic pixel. The light source is activated with control signals generated in accordance with each of the generated sub-pixels.

Thus according to the invention, each pixel is divided up into two sub-pixels which are exposed independently of one another by the light source. The first sub-pixel is exposed in accordance with the digital image data applicable to the pixel of which it forms a part. The same applies to the second sub-pixel unless (in the direct surroundings, i.e., in the said predetermined area) there is a transition between an area for exposure and one which is not to be exposed. In the latter case, any exposure of the second sub-pixel is switched off so that then there is only the exposure of the associated first sub-pixel. The second sub-pixel is exposed if the digital image data specify the exposure of the basic pixel and the values of basic pixels in the predetermined area around the associated basic pixel indicate that in that area there is no transition between an image portion for exposure and one which is not to be exposed. In this way, the light energy at edges and small structures is so reduced that there is no extension of an exposed area.

These and other objects of the present invention are achieved by providing an apparatus for reproducing an image, comprising: a first generator for generating digital image data in the form of binary values of basic pixels arranged in a raster; an electrophotographic printing unit for reproducing an image on an image support on the basis of processed digital image data, the printing unit having at least one electrically chargeable photo-conductive medium, a selectively activatable light source for image-wise discharge of the said medium and a developing unit for developing discharged portions of said medium with toner powder; a processing unit; and a control unit. The processing unit receives digital image data from the first generator, generates a first sub-pixel and a second sub-pixel for each basic pixel, gives the first sub-pixel a value equal to the value of the associated basic pixel, and gives the second sub-pixel a value dependent upon the values of the basic pixels in a predetermined area around the associated basic pixel. The control unit delivers control signals that selectively activate the light source in accordance with each of the sub-pixels in the processed image data, which compensates for properties of the printing unit.

The said first generator can be a receiving and interpretation unit for coded image information supplied via a network, or "front end", but also an electro-optical scanner with a half-tone device.

In a printing device provided with an array of LEDs for exposure of the photoconductive medium wherein said medium is advanced transversely of the longitudinal direction of the LED array in order to form a two-dimensional charge image, these and the other objects of the present invention are also achieved by providing a method in which the division of the pixels is achieved by doubling the line frequency with which the LED array is activated. The sub-pixels accordingly lie two-by-two in the transport direction of the photo-conductive medium, i.e., two new image lines of sub-pixels form from an image line of basic pixels. The following description of one embodiment of the invention relates to a printing device of this type. There are also printing devices in which exposure is carried out by a laser, the beam of light of which is moved by way of a rotating polygonal mirror over the surface of the photo-conductive medium in a direction extending transversely of the direction of transport of said medium. In such printing devices, it is simpler to place the sub-pixels two-by-two in the direction of the beam movement since otherwise the speed of rotation of the polygonal mirror would have to be doubled, and this involves engineering difficulties. Of course technical implementation of the invention in the latter printing device differs to some extent from that for an apparatus with an LED array, but such adaption does not involve undue experimentation for one of ordinary skill in the art.

In a first embodiment of the method according to the invention, the position of the first and second sub-pixels relative to one another is the same for all the basic pixels, i.e., for example, in the case of an LED array, all the first sub-pixels are situated in a first of two new image lines and all the second sub-pixels in the other new image line. In a second embodiment, the position of the first and second sub-pixels relative to one another is determined separately for each basic pixel by reference to the values of the surrounding basic pixels. In this way it is possible, if the two sub-pixels have different values, to link the exposed pixel to any exposure pattern in the neighboring basic pixels. For example, if the basic pixel is on the boundary between a black and white area, the black and white sub-pixels are arranged so that their arrangement is consistent with the boundary pattern.

An important additional aspect of the invention is that the light energy with which the first sub-pixels are exposed can differ from that with which the second sub-pixels are exposed. Practical research has shown that the ratio of the light energies of the first and second sub-pixels has a considerable influence on the print quality achieved and that adjustment thereof can be used as an instrument to optimize print quality. Different ratios can also be selected for digital image data from different sources.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 3A is a raster of input pixels.

FIG. 3B is a raster of reproduction pixels.

FIG. 4 is a window for analysis of input pixel values.

DETAILED DESCRIPTION OF THE PREFERRED EMBODIMENTS

Figure 1:
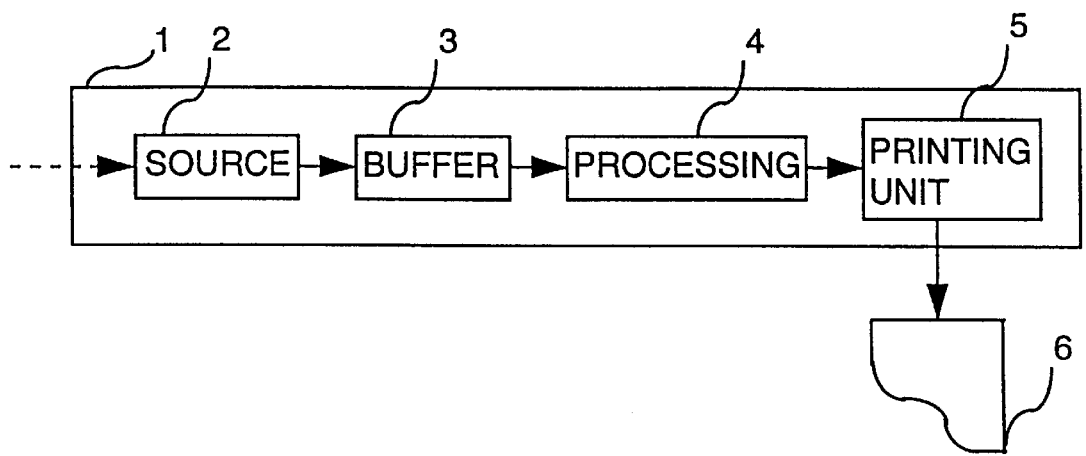
FIG. 1 is a diagram showing an apparatus according to the invention.

FIG. 1 diagrammatically illustrates an apparatus 1 according to the invention. This apparatus 1 comprises a signal source 2, a buffer memory 3, a processing unit 4 and a printing unit 5.

The signal source delivers digital image data representing binary pixel values which describe an image for printing in accordance with a raster of white or black pixels having a resolution which, in the exemplary embodiment described here, is the same in the horizontal and vertical directions. The signal source 2 is, for example, a unit for receiving coded image information for printing from a workstation and converting said image information into a binary raster image as frequently used in printers. The signal source 2 can also be formed by an electro-optical scanner with a half-tone device which converts the scanner signals to binary pixel values, in which case the apparatus 1 forms a digital copying machine. The apparatus 1 can also comprise both a scanner and a receiving unit, both connected to the processing unit 4 via the buffer memory 3.

The processing unit 4 receives digital image data from the memory 3, processes it in the manner to be described hereinafter, and delivers it, possibly via a buffer (not shown), to the printing unit 5, which converts the processed digital image data into a physical print 6 on a sheet of paper.

Figure 2:
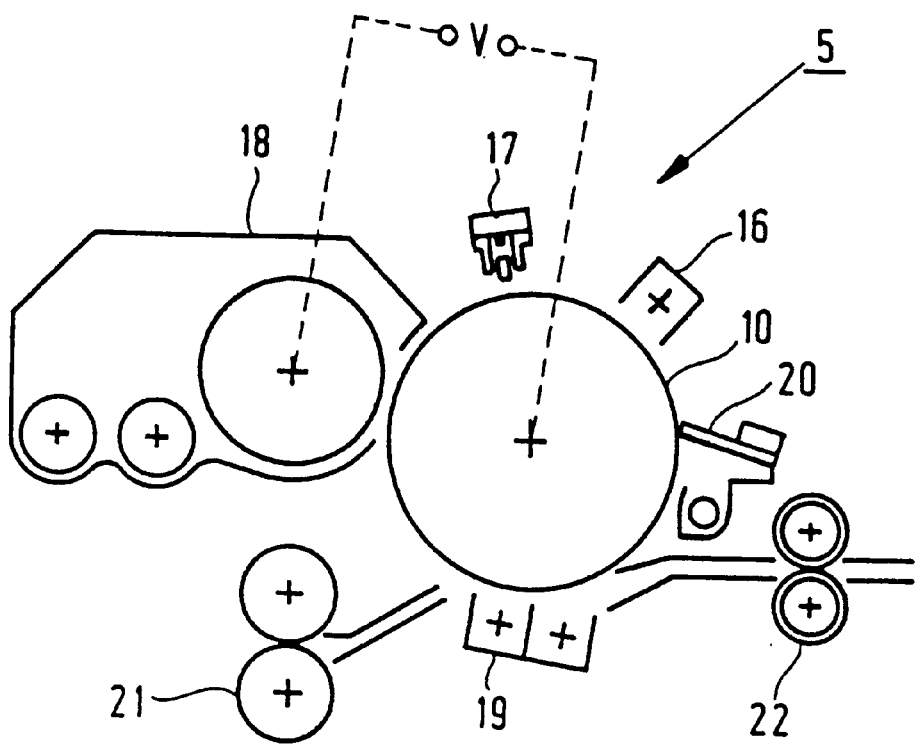
FIG. 2 shows a processing unit for making prints on the basis of digital image data.

The printing unit 5 is of the "black-writer" type and is shown in greater detail in FIG. 2. A cylinder 10 is coated with a layer of photo-conductive material and is surrounded by process stations 16, 17, 18, 19 and 20. In a charging station 16, the photo-conductive layer is provided with a uniform surface charge. The charged photo-conductive layer is then exposed image- wise in accordance with a raster pattern of pixels in the image data as supplied by the processing unit 4, the exposure taking place in the exposure station 17 formed by an LED array with an associated control unit. The surface charge partially flows away in exposed areas. The LED array exposes a linear area in accordance with an image line of the digital image. Since the cylinder with the photo-conductive layer continues to rotate beneath the LED array and this array always exposes a new image line, there forms on the photo-conductive layer a pattern of charged areas with surface potentials of 800 V (unexposed) and −300 V (exposed) respectively. The photo-conductive layer with the charge pattern thus formed is then taken along a developing station 18 including a roller with a magnetic core that is covered with a layer of two-component developer. Here a voltage of −700 V is applied, which substantially compensates for the surface potential of the unexposed areas on the photo-conductive layer, and the exposed areas are developed with negatively charged black powder, which is termed a toner.

The resulting toner image is transferred to a sheet of paper in a transfer station 19 formed by a corona unit. The photo-conductive layer 10 then has any residues of non-transferred toner removed in a cleaning unit 20, whereupon it is ready for the next operation in the process.

The said sheet of paper is supplied from a feed tray (not shown) and is fed by a pair of rollers 21 to the transfer station 19. From here the paper with the toner image is passed between two heated rubberized rollers 22, where the toner is fused on the paper surface.

This process is generally known in electrophotography and will therefore not be explained in greater detail here.

The processing of the digital image data in the processing unit 4 will now be explained with reference to FIGS. 3A, 3B and 4.

An image for printing is conventionally represented by a raster of image elements or pixels, the grey values of which are given by digital numbers. In many systems, such as the system described here, the pixels can have one of two different values, namely white or black. This is specified by a binary number, 1 or 0. The raster comprises rows (often termed image lines) and columns, usually of identical resolution, so that the pixels are square. The resolution, for example, is 400 dots per inch (dpi).

According to the invention, each input pixel is converted into two new pixels, hereinafter referred to as pels, which together occupy the same space as an input pixel. All the input pixels are divided into pels in the same way, i.e., either by splitting the rows wherein the input image lines each are converted to two parallel new image lines so that the resolution of the pixels is doubled in the column direction, or by splitting the columns wherein the input image columns each are converted to two parallel image columns so that the resolution of the pixels is doubled in the row direction. The choice depends on the imaging system: the two new pels are situated next to one another in the scanning direction of the light source. In the system of an LED array described herein, in which the photo-conductive medium is transported along an array of fixed LEDs, the pels are therefore one beneath the other in the direction of transport, and two new lines are formed from one input image line and are exposed successively on the medium.

For any two corresponding pels, one is always given the same value as the input pixel had. This pel is hereinafter referred to as the "information pel". The other pel, hereinafter referred to as the "blackening pel", is given a value which is dependent on the values of the surrounding input pixels, in the following manner. If the corresponding pixel is situated in an area for developing but not at an edge thereof, or in an area which is not to be developed, then the blackening pel is given the same value as the input pixel. If the input pixel is in an area for developing but just on or near an edge thereof, or if it forms part of a narrow line for development or some other small detail, then the blackening pel is given the value which is the opposite of that of the input pixel, i.e., it is given a value which corresponds to "not for exposure".

The object of this sub-pixellation is to prevent edges and narrow lines from being developed too intensively, while nevertheless ensuring good area blackening. It should be noted that the light spot is of dimensions such that light spots on two corresponding pels overlap one another to a significant extent and have a joint effect on the developed image rather than that supplied by two separately distinguishable dots. If both pels are exposed, the area developed is somewhat larger than the area of the input pixel. This results in good blackening in areas where the developed pixels thus overlap to some extent, but edges and narrow lines are reproduced with too great a width by this effect. In the latter case, therefore, the blackening pel is not exposed, so that development is produced solely by the information pel.

In illustration of the foregoing, FIG. 3A shows part of a digital image divided up into pixels. Pixels which have to be exposed (and developed) are shown by hatching.

FIG. 3B shows the pattern of information pels and blackening pels as generated according to the invention from the pixel pattern of FIG. 3A. The pixels are divided up vertically into information pels and blackening pels and hatching indicates which of these are exposed.

According to an embodiment of the invention, the decision whether a blackening pel of a pixel is to be exposed is made according to a window operation. A window as shown in FIG. 4 is placed over the pixel raster of the image and the pixel values within the window are evaluated in accordance with a predetermined algorithm. The pixels within the window are denoted by a letter. The pixel with the letter "k" is considered the evaluation center and the evaluation of the pixel values within the window is the basis for determining whether the blackening pel of pixel "k" is exposed. After each evaluation the window is shifted one raster position for evaluation of the next pixel.

The following algorithm has proved satisfactory in practice (the letter "w" hereinafter denotes: not to be exposed, and the letter "z" denotes: to be exposed):

If k=w, then do not expose the blackening pel;

If k=z, then expose the blackening pel, unless:

p=w or f=w and b=w or f=w and b=z and $\Sigma_w[a,b,c,e,g,j,l]>3$ or l=w and g=w and q=w or l=w and $\Sigma_z[g,q]=1$ and $\Sigma_w[f,g,h,m,p,q,r]>3$ or j=w and e=w and o=w and i=w or j=w and $\Sigma_w[e,o,i]=1$ and $\Sigma_w[d,e,f,i,n,o,p]>3$ Here "$\Sigma_w[a,b,c]$" denotes: the number of pixels with the value w in the set a, b, c. The term "$\Sigma_z$" is defined similarly.

Figure 5:
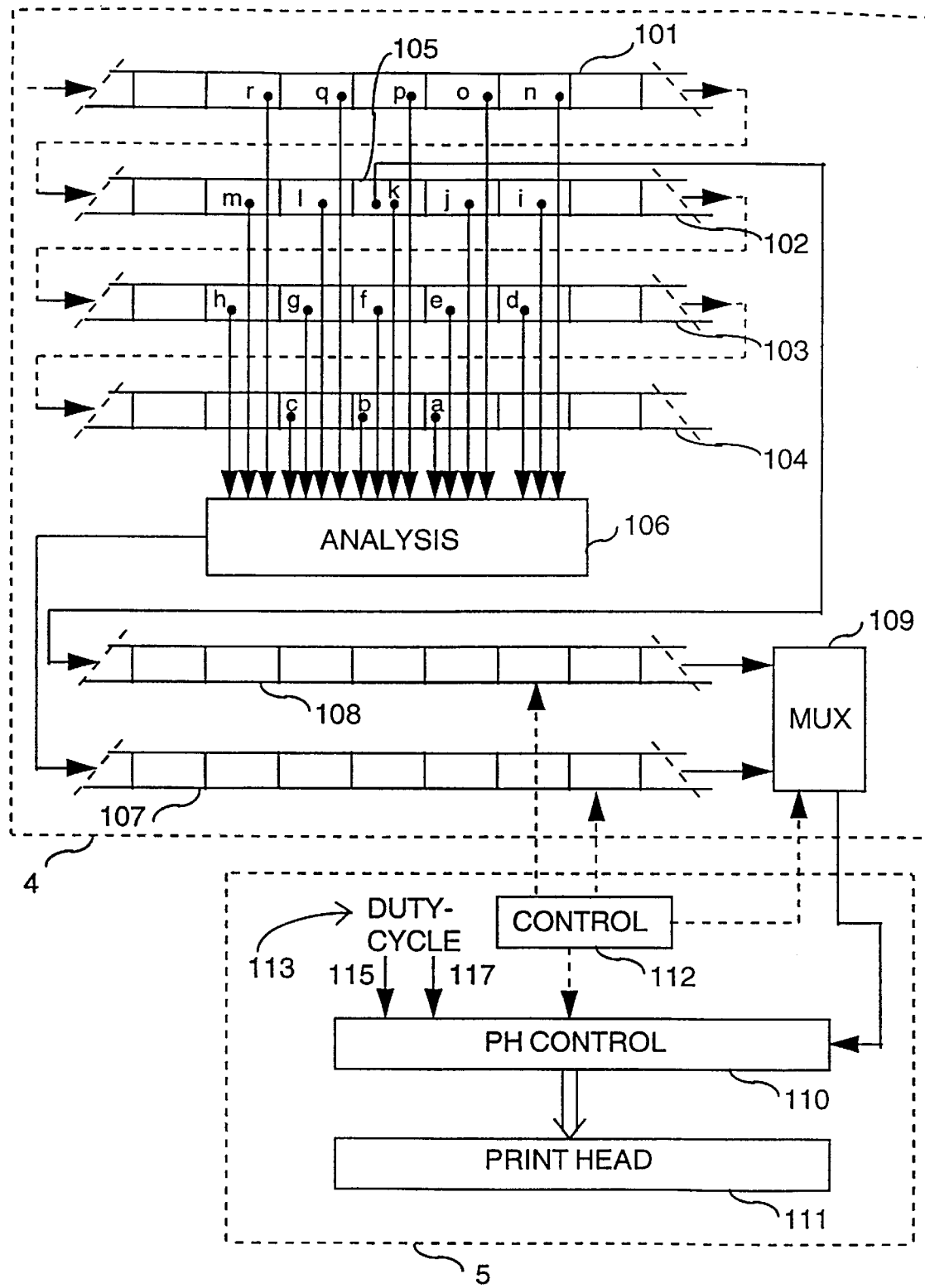
FIG. 5 is a diagram showing the principle of a processing unit for pixel values.

FIG. 5 is a diagram showing the principle of the relevant parts of the processing unit 4 by which exposure or non-exposure of the blackening pels can be determined in accordance with the above-described algorithm, and the printing unit 5. The processing unit comprises four series-connected shift registers 101, 102, 103 and 104. These shift registers have a length (number of cells) equal to an image line (number of pixels). The input of shift register 101 is connected to the buffer memory 3 in order to receive therefrom a series of pixel values of an image for printing.

Plural cells of the shift registers are connected to the analysis circuit 106, which is in turn connected to line buffer 107, again of a length of an image line. One of the cells (105) of the shift register 103 is also connected to line buffer 108. The line buffers 107 and 108 are both connected via a multiplexer 109 to a printhead control unit 110. The latter is connected to the printhead 111. The printhead control unit 110 and the printhead 111 together form the exposure station 17 (FIG. 2) of the printing unit 5 (FIG. 1). A control unit 112 is connected to the line buffers 107 and 108, the multiplexer 109 and the printhead control unit 110 in order to control these elements.

In operation, input pixel values of an image for printing are fed to the input of shift register 101 and successively traverse the shift registers 101, 102, 103 and 104. In this way, all the pixels of the image pass through the cell 105. At any time, the pixel in this cell is considered the central pixel k in an analysis window formed by the pixels a–r in the cells which are connected to the analysis circuit 106. The latter comprises logic circuits for combining the pixel values in the connected cells to give a value which is then given to the blackening pel associated with the pixel in cell 105. The values of the blackening pels as thus determined are successively fed to line buffer 107 and form an image line of blackening pels therein.

The values of the input pixels are fed from cell 105 to line buffer 108 where they form an image line of information pels. Elements (not shown) ensure that the value of the blackening pel and the information pel associated with the pixel value present in the cell 105 at any time are fed simultaneously to the line buffers 107 and 108.

Immediately after an image line of information pels and of blackening pels have been written into the line buffers 107 and 108, the printhead control unit 109 reads them out, on command from the control unit 112, via the multiplexer 109 and has them printed by the printhead so that first a line of information pixels and then a line of blackening pels are exposed on the photo-conductive medium in synchronization with its movement.

In a first embodiment, the lines of information pels and blackening pels are exposed with equal energy, i.e., the LED's of the printhead are so controlled that they deliver the same light energy for both lines. The amount of light energy can be controlled by changing the duration of electrical energization of the LEDs per image line, this being referred to as the "duty cycle".

In practice, however, it has been found that the effect is often better if different line energies or duty cycles are used for the two types of lines. In a second embodiment, therefore, a functional ability to control the duty cycle is added to the printhead control unit 109. This is shown as item 113 in FIG. 5, where the value of the duty cycle for the information pels 115 and the blackening pels 117 are fed as external control signals to the printhead control unit 109. The duty cycle setting can be changed by adjusting the control signals 115 and 117. The printhead control unit simultaneously selects with each line the corresponding control signal and adapts the duty cycle thereto. The duty cycle value applies to all the LEDs simultaneously, but may possibly be combined with a duty cycle control for each LED separately for the purpose of individual uniformity control.

By the duty cycle adjustment, it is possible to adapt the exposure to the properties of the image-forming system. In fat-developing systems, for example, the ratio of the duty cycles of the information pels and blackening pels can be selected at 1:2. In addition, tolerances in image-forming systems could be compensated in the same way. In such cases, the adjustment of the duty cycles can be carried out, for example, by a service engineer, the copy quality being an (experimental) parameter.

At the same time, different ratios can be selected also for digital image data from different sources. Image data generated by an electro-optical scanner usually have noise pixels, i.e., pixels having the wrong value due to noise in the scanner or other causes. These noise pixels are annoying particularly in white areas. The processing of the image data according to the invention suppresses these pixels to varying degrees, depending on the light energy ratio set. This ratio, of course, will be so optimized that noise pixels are suppressed as far as possible while on the other hand small details (which are of course also suppressed) are still reproduced acceptably. Digital image data generated by a receiving and interpretation unit for print data, e.g., from a workstation, have no noise pixels whatever and, on the contrary, many finer details, such as lines with a thickness of a pixel, and consequently the reproduction of small details will be emphasized on optimization of the light energy ratio. It will be apparent that the light energy ratio will then be different from that applicable to image data from a scanner. To allow such an adapted choice of light energy ratio, the printhead control unit 109 is connected to the general apparatus control system from which it receives data concerning the origin of the particular image data to be printed.

In another embodiment, it is possible to select (for each input pixel) the location of the information pel and the blackening pel if these pels have different values. In this way it is possible to allow for any variation in blackening in the surroundings of the pixel. The information required for this purpose can be obtained from an analysis of the surrounding pixels. If, however, in such cases it is desired to apply the above-mentioned unequal distribution of duty cycles, then an LED array is required in which the duty cycles can be controlled separately per LED and per pel, and such arrays are very expensive. It has also been found that this does not always result in an improvement in image quality, so that in some systems this embodiment has no advantage over the variant with fixed allocation of the information and blackening pixels. Here again a choice can be made depending on the origin of the image data for printing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In an electrophotographic printing unit having at least one electrically chargeable photo-conductive medium, a selectively activatable light source for image-wise discharge of said medium and a developing unit for developing said medium with toner powder, a method of reproducing images formed from binary values of basic pixels arranged in a raster, the method compensating for properties of the printing unit, the method comprising the steps of:

generating a first and a second sub-pixel for each basic pixel of the digital image data, each said first sub-pixel corresponding in value to the associated basic pixel, each said second sub-pixel having a value determined as a function of the value of the associated basic pixel and values of basic pixels in a predetermined area around the associated basic pixel; and generating control signals in accordance with the values of the sub-pixels, respectively, to selectively activate the light source and so compensate for properties of the printing unit such that, for at least substantially every basic pixel that is to be exposed and that is immediately adjacent to a transition from a to-be-unexposed pixel to the to-be-exposed basic pixel, said first sub-pixel is set to be exposed and said second sub-pixel is set to be unexposed.

2. A method according to claim 1, wherein the step of generating the first and second sub-pixel includes:
   setting said second sub-pixel to a value corresponding to activation of the light source if the value of the associated basic pixel specifies the activation of the light source and if the values of the basic pixels in said predetermined area around the associated basic pixel indicate that in said area there is no transition between a first image portion that is to be exposed and a second image portion which is not to be exposed.

3. A method according to claim 2, in an electrophotographic printing unit in which exposed portions of the photo-conductive medium are developed with toner powder, wherein the step of setting said second sub-pixel includes:
   giving said second sub-pixel a value corresponding to activation of the light source if the value of the associated basic pixel specifies development with toner powder and if the values of the basic pixels in said predetermined area indicate that in said area there is no transition between a third image portion which is to be developed and a fourth image portion which is not to be developed.

4. A method according to claim 2, in an electrophotographic printing unit in which unexposed portions of the photo-conductive medium are developed with toner powder, wherein the step of setting said second sub-pixel includes:
   giving said second sub-pixel a value corresponding to the activation of the light source if the value of the associated basic pixel specifies non-development with toner powder and if the values of the basic pixels in said predetermined area indicate that in said area there is no transition between a third image portion which is to be developed and a fourth image portion which is not to be developed.

5. A method according to claim 1, wherein the step of generating the first and second sub-pixel includes:
   converting an image line of basic pixels into two adjacent image lines of sub-pixels.

6. A method according to claim 5, wherein the step of generating the first and second sub-pixel includes:
   keeping a position of the first sub-pixel, relative to the second sub-pixel, the same for all of the basic pixels.

7. A method according to claim 5, wherein the step of generating the first and second sub-pixel includes:
   determining a position of the first sub-pixel, relative to the second sub-pixel, separately for each basic pixel by reference to the values of basic pixels neighboring the associated basic pixel.

8. A method according to claim 1, wherein the step of generating the first and second sub-pixel includes:
   converting an image column of basic pixels into two adjacent image columns of sub-pixels.

9. A method according to claim 1, wherein the step of generating control signals includes:
   controlling the light source to deliver a first light energy in response to a control signal corresponding to a value of a first sub-pixel and controlling the light source to deliver a second light energy in response to a control signal corresponding to a value of a second sub-pixel, said first light energy being different from said second light energy.

10. A method according to claim 9, wherein the step of controlling includes:
    using a duty cycle with which the light source is activated for setting a light energy.

11. A method according to claim 1, wherein said step of generating said first and second sub-pixels uses the following algorithm, where said algorithm is applied to a window arrangement of pixels defined as follows

|   | a | b | c |   |
|---|---|---|---|---|
| d | e | f | g | h |
| i | j | k | l | m |
| n | o | p | q | r | and where the letter w hereinafter denotes a not-to-be-exposed condition and the letter z denotes a to-be-exposed condition:
   if k=w, then do not expose the second sub-pixel;
   if k=z, then expose the second sub-pixel, unless
      p=w
      or
      f=w and b=w
      or
      f=w and b=z and $\Sigma_w[a,b,c,e,g,j,l]>3$
      or
      l=w and g=w and q=w
      or
      l=w and $\Sigma_z[g,q]=1$ and $\Sigma_w[f,g,h,m,p,q,r]>3$
      or
      j=w and e=w and o=w and i=w
      or
      j=w and $\Sigma_z[e,o,i]=1$ and $\Sigma_w[d,e,fi,n,o,p]>3$;
   where $\Sigma_w[a,b,c]$ denotes the number of pixels with the value w in the set a, b, c and the term $\Sigma_z$ denotes the number of pixels with the value z in the set e, o, i.

12. A method according to claim 1, wherein said control signals are so generated as to effectively reduce an extension of exposed areas over boundaries thereof with unexposed areas.

13. A method according to claim 1, wherein said step of generating control signals selectively activates and so compensates all of said basic pixels that are to be exposed and that are immediately adjacent to a transition from a to-be-unexposed pixel to the to-be-exposed basic pixel.

14. An apparatus for reproducing an image, comprising:
   a first generator for generating digital image data in the form of binary values of basic pixels arranged in a raster;
   an electrophotographic printing unit for reproducing an image on an image support on the basis of processed digital image data, the printing unit having at least one electrically chargeable photo-conductive medium, a selectively activatable light source for image-wise discharge of the said medium and a developing unit for developing said medium with toner powder;
   a processing unit for receiving digital image data from the first generator, for generating a first sub-pixel and a second sub-pixel for each basic pixel, for setting the first sub-pixel to a value equal to the value of the associated basic pixel, and for setting the second sub-pixel to a value dependent upon the value of the associated basic pixel and values of basic pixels in a predetermined area around the associated basic pixel; and a control unit for delivering control signals to selectively activate the light source in accordance with each of the sub-pixels in the processed image data and to compensate for properties of the printing unit such that, for at least substantially every basic pixel that is to be exposed and that is immediately adjacent to a transition from a to-be-unexposed pixel to the to-be-exposed basic pixel, said first sub-pixel is set to be exposed and said second sub-pixel is set to be unexposed.

15. An apparatus according to claim 14, wherein said processing unit is operable to allocate to the second sub-pixel a value corresponding to activation of the light source if the value of the associated basic pixel specifies activation of the light source and if, in said predetermined area around the associated basic pixel, there is no transition between a first image portion which is to be exposed and a second image portion which is not to be exposed.

16. An apparatus according to claim 15, wherein the printing unit is of a type in which exposed portions of the photo-conductive medium are developed with toner powder, and wherein the processing unit is operable to allocate to the second sub-pixel a value corresponding to the activation of the light source if the value of the associated basic pixel specifies development with toner powder and if, in said predetermined area around the associated basic pixel, there is no transition between a third image portion which is to be developed and a fourth image portion is not to be developed.

17. An apparatus according to claim 15, wherein the printing unit is of a type in which unexposed portions of the photo-conductive medium are developed with toner powder, and wherein the printing unit is operable to allocate to the second sub-pixel a value corresponding to the activation of the light source if the value of the associated basic pixel specifies development with toner powder and if, in said predetermined area around the associated basic pixel, there is no transition between a third image portion which is to be developed and a fourth image portion which is not to be developed.

18. An apparatus according to claim 14, wherein the processing unit is operable to convert an image line of basic pixels into two adjacent image lines of sub-pixels.

19. An apparatus according to claim 18, wherein the processing unit is operable to determine a position of the first sub-pixel, relative to the second sub-pixel, in the same manner for all the basic pixels.

20. An apparatus according to claim 18, wherein the processing unit is operable to determine a position of the first sub-pixel, relative to the second sub-pixel, separately for each basic pixel by reference to the values of basic pixels neighboring the associated basic pixel.

21. An apparatus as in claim 14, wherein the processing unit is operable to convert an image column of basic pixels into two adjacent image columns of sub-pixels.

22. An apparatus according to claim 14, wherein the control unit is operable to control the light source to deliver a first light energy in accordance with a value of a first sub-pixel and the control unit is operable to control the light source to deliver a second light energy in accordance with a value of a second sub-pixel, said first light energy being different from said second light energy.

23. An apparatus according to claim 22, further comprising:
adjustment means for adjusting the first and second light energies separately.

24. An apparatus according to claim 23, wherein said adjustment means is operable to adjust a light energy according to a duty cycle with which the light source is activated.

25. An apparatus according to claim 14, wherein the first generator comprises a receiving and interpretation unit for receiving and interpreting coded image information fed via a network.

26. An apparatus according to claim 14, wherein the first generator comprises an electro-optical scanner with a half-tone device.

27. An apparatus according to claim 14, wherein the first generator comprises a receiving and interpretation unit for receiving and interpreting coded image information fed via a network and an electro-optical scanner with a half-tone device, wherein the control unit is operable to control the light source to deliver a predetermined first light energy in accordance with a first sub-pixel and to deliver a predetermined second light energy in accordance with a second sub-pixel, the first light energy being different from the second light energy, and wherein the first and second light energies delivered for digital image data generated by said receiving and interpretation unit are different from the first and second light energies delivered for digital image data generated by said electro-optical scanner with a half-tone device.

28. An apparatus according to claim 14, wherein said processing unit is operable to generate said first and second sub-pixels using the following algorithm, where said algorithm is applied to a window arrangement of pixels defined as follows

|   | a | b | c |   |
|---|---|---|---|---|
| d | e | f | g | h |
| i | j | k | l | m |
| n | o | p | q | r | and where the letter w hereinafter denotes a not-to-be-exposed condition and the letter z denotes a to-be-exposed condition:

if k=w, then do not expose the second sub-pixel;
if k=z, then expose the second sub-pixel, unless
    p=w
      or
    f=w and b=w
      or
    f=w and b=z and $\Sigma_w[a,b,c,e,g,j,l]>3$
      or
    l=w and g=w and q=w
      or
    l=w and $\Sigma_z[g,q]=1$ and $\Sigma_w[f,g,h,m,p,q,r]>3$
      or
    j=w and e=w and o=w and i=w
      or
    j=w and $\Sigma_z[e,o,i]=1$ and $\Sigma_w[d,e,f,i,n,o,p]>3$;
where $\Sigma_w[a,b,c]$ denotes the number of pixels with the value w in the set a, b, c and the term $\Sigma_z$ denotes the number of pixels with the value z in the set e, o, i.

29. An apparatus according to claim 14, wherein said control unit is operable effectively reduce an extension of exposed areas over boundaries thereof with unexposed areas.

30. An apparatus according to claim 14, wherein said control unit is operable to selectively activate and so compensate all of said basic pixels that are to be exposed and that are immediately adjacent to a transition from a to-be-unexposed pixel to the to-be-exposed basic pixel.

* * * * *